Jan. 10, 1950 H. O. PETERSON ET AL 2,494,309

DIVERSITY RECEIVER

Filed Nov. 17, 1945 3 Sheets-Sheet 1

INVENTORS
Harold O. Peterson &
Robert E. Schock
BY H. S. Grover
ATTORNEY

DIVERSITY RECEIVER

Filed Nov. 17, 1945 3 Sheets-Sheet 2

INVENTORS
Harold O. Peterson
& Robert E. Schock
BY H. S. Grover
ATTORNEY

DIVERSITY RECEIVER

Filed Nov. 17, 1945 3 Sheets-Sheet 3

INVENTORS
Harold O. Peterson
& Robert E. Schock
BY H. S. Grover
ATTORNEY

Patented Jan. 10, 1950

2,494,309

UNITED STATES PATENT OFFICE 2,494,309

DIVERSITY RECEIVER

Harold O. Peterson and Robert E. Schock, Riverhead, N. Y., assignors to Radio Corporation of America, a corporation of Delaware Application November 17, 1945, Serial No. 629,298

3 Claims. (Cl. 250—8)

Figure 1:
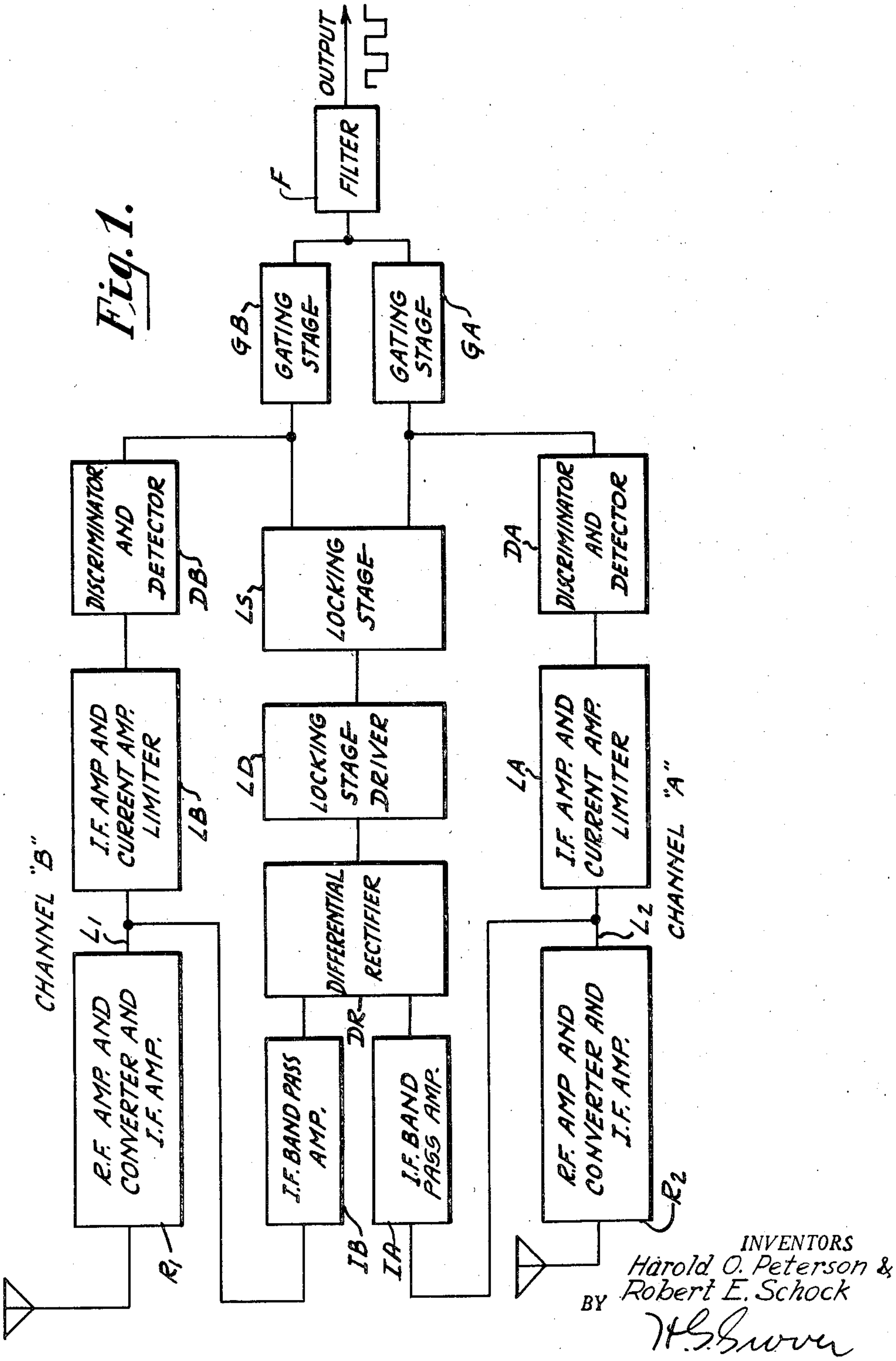

This application relates to receiving systems in general. In particular this application relates to diversity receivers and the same when used in telegraphy systems of any type, facsimile systems and similar systems using pulse energy of varying magnitude. The application also applies to locking circuits and control circuits therefor which are of wide use in the signalling art.

The application in particular relates to receivers of frequency shift signals. Frequency shift signals may be considered frequency modulation signals because in these signals marking characters may be represented by current of one frequency and spacing characters by current of a frequency separated from said one frequency by several hundred cycles. Signals may be produced by keying an oscillator from a first frequency to a second frequency in accordance with signals, or by producing oscillations of different frequency and keying the oscillations alternatively, or by modulating a low frequency oscillator between two frequencies and modulating a high frequency carrier by the modulated low frequency oscillations. The signals also have characters of on-off telegraphy since they are alternatively present and provide as output pulse energy the amplitude of which changes between a first value representing mark and a second value representing space.

Diversity receiver systems for keyed telegraphy signals have been in use for some time and have given highly satisfactory service. However, frequency shift telegraphy has the characteristics of frequency modulation and frequency modulation has inherent advantages such as, for instance, an increased signal to noise ratio and other advantages known in the art. An object of our invention is to provide an improved telegraphy receiver system for frequency shift signals to thereby make available the advantages inherent in frequency modulation systems.

We have at hand diversity equipment including radio frequency amplifiers, frequency reducers in the form of heterodyning circuits, automatic gain control connections and additional heterodyning means with intermediate frequency amplifiers feeding detectors and recording apparatus. These systems, however, do not make use of frequency shift telegraphy and as a consequence do not make available advantages inherent in frequency modulation signalling systems. An object of our invention is to provide an adapter for this existing diversity equipment, which adapter will enable the reception of frequency shift signals. This object is accomplished by providing a frequency shift adapter which takes its input from the intermediate frequency stages in the existing equipment and selects the best signal and amplifies and uses the same for recording purposes.

In diversity receivers known in the prior art, means is provided for selecting the output of the best receiver and using it for recording purposes directly, or, indirectly by keying a tone source on and off and using the keyed tone for recording. In these systems the selection of the best signal may be accomplished in various manners. In some systems volume control connections are arranged so that the receiver having the strongest signal sets up a gain control bias for amplifying means in each of the receivers to bias all of the receivers off except that one getting the strongest signal. In other systems such as, for example, disclosed in Lyons U. S. application Serial #578,877, filed Feb. 20, 1944, diversity receivers for frequency shift telegraphy include means in each of the several receivers which supplies what is called a gating potential to control a gating tube or valve in each of the receivers. The valves or gates are so operated and controlled that the valve or gate for the receiver getting the best signal is opened to supply signal output from that receiver. Simultaneously, the gates or tube valves of the remaining receivers are closed. In these systems as known in the prior art the gating action is slow and does not respond rapidly to changes in the quality of the signals from the several receivers. Such systems may be satisfactory for certain types of signals but we have found that in frequency shift receiving systems good results cannot be obtained unless fast means is provided for selecting the best receiver output. For example, as is well known, transmitted signals of this nature are subjected to random fading and the amount of fading may vary with small differences in frequency. Thus at a given moment one receiver may get a good signal when the transmitter is on mark interval, and a poor signal when the transmitter is on space interval. On the other hand, at the same moment, a second receiver of the diversity system may have good signals when the transmitter is on space interval, and a poor signal when the transmitter is on mark interval. Obviously, to derive the ultimate benefits from frequency diversity the system for selecting the best receiver output should be fast enough to select the output from one receiver while the signal is on mark interval, and the output from the other receiver while the signal is on space interval.

An object of our present invention is to provide a new and improved and fast acting means for selecting output from that receiver supplying the best output and for shutting off or rejecting the other receiver outputs. This object is attained in accordance with our invention by utilizing a receiver output selecting system of the type which has become known in the art as a gating system. These systems are in general as described in the Lyons application referred to hereinbefore. In our system, however, the control potentials operate through a locking circuit to control the conductivity of the gating tubes. We have a selecting or switching system faster than the keying speed so that it is fast enough to select mark characters on one receiver and space characters on the other receiver or vice versa. Moreover our improved locking circuit not only responds substantially instantly to changes in magnitude of the control potential, but also performs a limiting and wave forming function highly effective for the needs at hand. Our system, however, is not as fast in operation as the double locking arrangement of U. S. application Serial No. 632,978, filed December 5, 1945.

The best signal intercepted by the receivers of the diversity system is selected for use, and an object of our invention is improved signal magnitude comparison for this selection. This object is attained by supplying signals from two receivers to a differential rectifier circuit which senses which of the signals is the strongest at any and all instants of time and supplies this information in the form of a control potential to the locking circuit driver or control tube.

The differential detector senses the best signal and provides a potential the polarity of which changes as the signals at the several receivers fade in and out. This direct current potential is to trigger the locking circuit to one of its two possible conditions in accordance with the selection made by the differential detector circuit.

The locking circuit as controlled in turn controls the conductivity of a pair of gating tubes and an object of our invention is improved gating tube control in accordance with the tripping of the locking circuit. This improved gating tube control turns on fully one of the gating tubes and cuts off definitely the other gating tube. The action is made positive and the inherent positive action of the triggering or locking circuit makes the same ideal for gating tube control.

The output of the gating tubes in one embodiment is keyed pulse energy with transients thereon resulting from keying and the same is to be applied to recording apparatus. The gate tube output is fed through a coupling and filtering circuit to the recording apparatus.

In a second embodiment the gating is done at I. F. or superaudible frequency and a single discriminator and detector follows the gating tubes and the filter described above follows this detector.

In operation it is desirable to be able to check at all times the operativeness of the gating tubes and an object of our invention is to provide a simple and accurate means for doing this. This means includes milliammeters in the cathode returns of the gating tubes, the current through which indicates the operativeness of the respective tubes.

Figure 2:
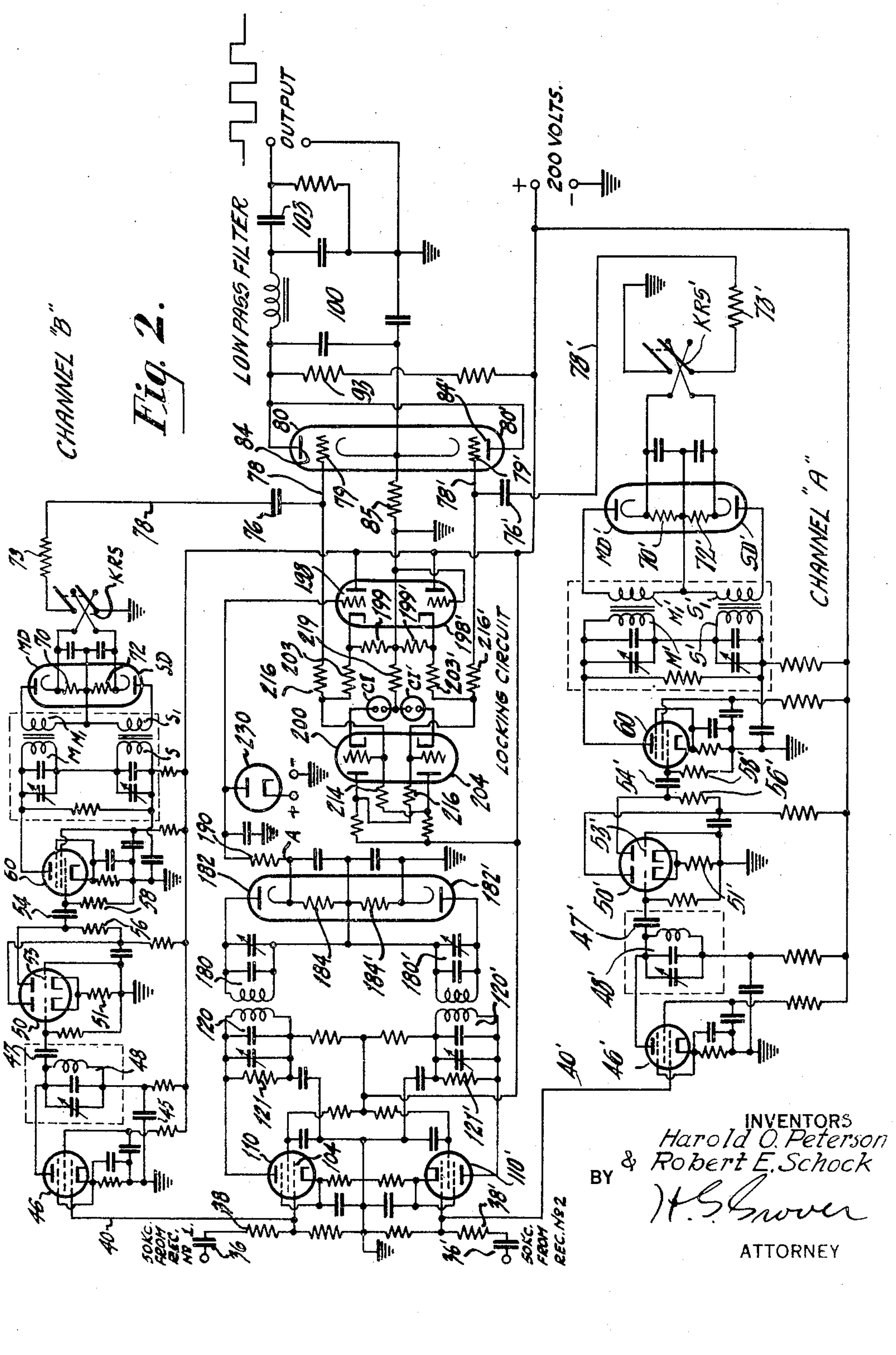
Figure 3:
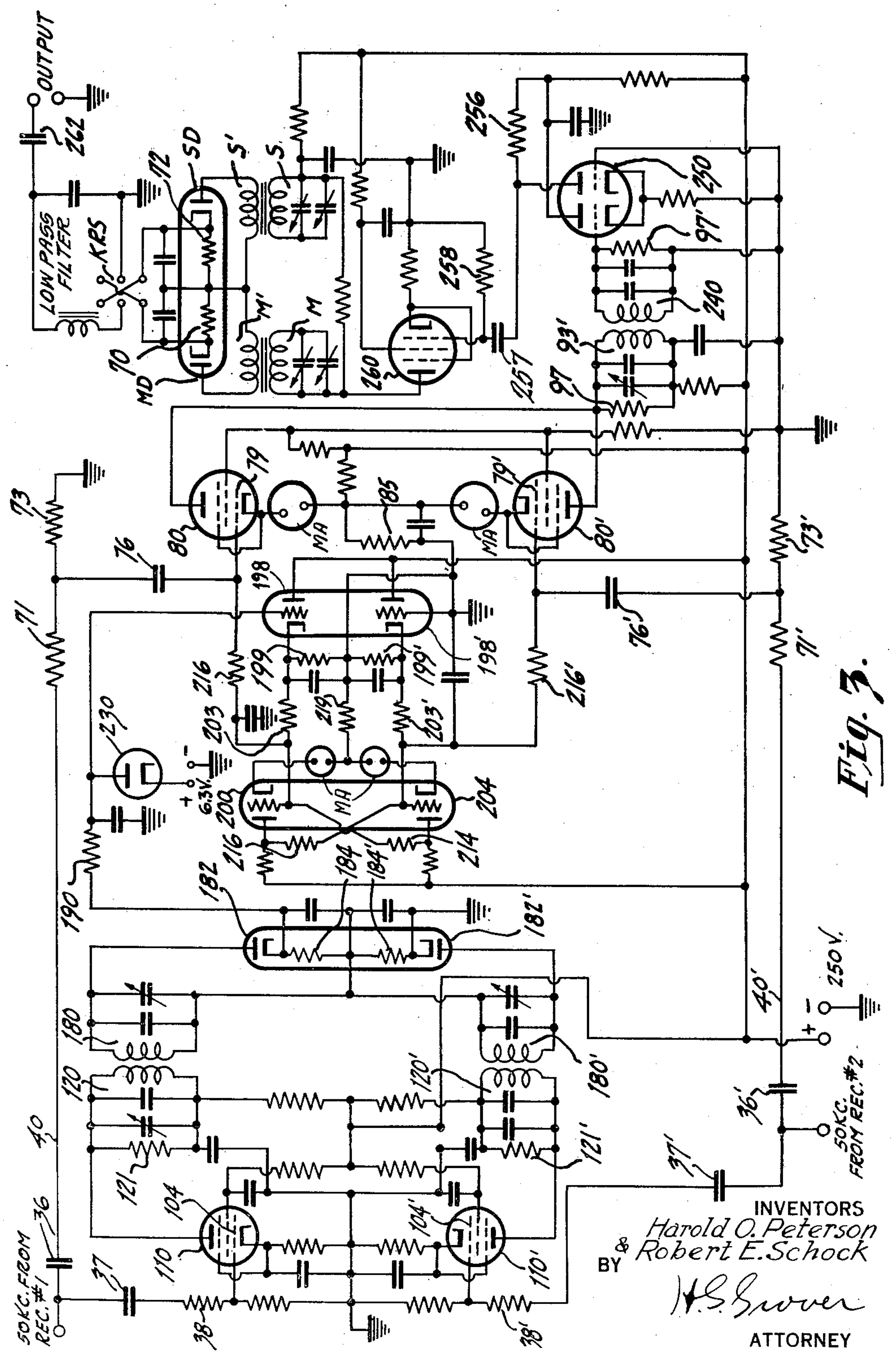

In describing our invention reference will be made to the attached drawings, wherein we have illustrated in Fig. 1 by block diagram and in Fig. 2 by circuit element and circuit connection the essential features of a diversity receiver output combining system arranged in accordance with our invention. In Fig. 3 we illustrate by circuit element and circuit connection a modification of the arrangement of Figs. 1 and 2. In the arrangements of Figs. 1 and 2 the gating tubes pass signals after demodulation, whereas in Fig. 3 demodulation takes place after the gating action.

As illustrated in Fig. 1, two receivers $R_1$ and $R_2$ of one of our assignee's standard diversity systems are assumed to be supplying outputs at 50 kc. $\pm$FS/2 by lines $L_1$ and $L_2$ to our frequency shift combiner unit. Our adapter has two signal amplifier channels designated channel B and channel A. The receiver output may be at say 50 kc. $\pm$ half of the frequency shift FS. The system as stated hereinbefore is particularly adapted to frequency modulation of the type known as frequency shift telegraphy, in which case the 50 kc. I. F. is shifted from one frequency representing mark (high frequency) to another frequency representing space, separated from the first frequency several hundred cycles. In the embodiment illustrated in Figs. 1 and 2 two radio frequency amplifiers are assumed to be supplying 50 kc. keyed output to our improved frequency shift keying system. These keying units each comprise two intermediate frequency amplifying channels, A and B, each having a limiter and intermediate frequency amplifier LB and LA, and a discriminator and detector DB and DA which derive pulses corresponding to the frequency shifts and supply the same to gating stages GB and GA. Each channel also includes an I. F. band pass amplifier IB and IA which feed signals to a differential rectifier DR wherein their magnitudes are compared and a resultant potential the magnitude of which indicates which channel has the best signal is developed. This potential controls a locking circuit driver or control stage LD for a locking stage LS which opens gate A or gate B. The opened gating stage supplies output to a filter stage F. The output controls a tone keyer, not shown.

In the description of Fig. 2 which follows, for the sake of brevity and simplicity one channel will be described in detail. Corresponding reference numerals will be used in so far as possible in both channels, the reference numerals being primed in channel A.

Channel B is arranged to be excited at its input by output from receiver #1 or $R_1$, while channel A is arranged to be excited at its input by signals from receiver #2 or $R_2$. The 50 kc.$\pm$FS/2 energy is impressed from say receiver #1 by condenser 36 and resistor 38 and lead 40 on to the control grid of a first I. F. amplifier stage tube 46 for amplification therein. The tube 46 is connected substantially conventionally, having the usual cathode resistance and condenser unit and grid leak resistance, etc. The anode of the tube 46 is coupled to a circuit 48 tuned to parallel resonance substantially at 50 kc. In practice this circuit is tuned to a frequency intermediate the mark and space frequencies. The low radio frequency potential end of this circuit is connected to the positive terminal of a source of direct current potential and substantially directly to ground and the cathode by a bypassing condenser 45. The amplified intermediate frequency energy is supplied from the anode of tube 46 by a coupling condenser 47 to the control grid of an amplifying and limiting stage including tube 50. The two cathodes of this double triode tube are tied together and connected to ground by a common cathode resistor 51. The grid 53 of the second triode is also grounded. The anode of the first triode is coupled to a source of direct current potential while the anode of the second triode is coupled by a condenser 54, resistance 56 and resistance 58 to the control grid of a following intermediate frequency amplifier stage including tube 60. The amplifying limiter including tube 50 is substantially as disclosed in Crosby U. S. Patent #2,276,565, and is arranged for full wave limiting. This takes place by virtue of the fact that the negative half cycles of the incoming I. F. wave bias the first half of the double triode 50 to cutoff so that negative limiting takes place in the first half on the negative half cycles of the keyed supersonic signals. On the positive half cycles of the supersonic signals the control grid of the first triode becomes less negative or positive so that current flows through the resistance 51, and the potential drop in this resistance is applied to the grid 53 to operate the same beyond cutoff so that negative limiting takes place in the second triode of the limiter stage on the positive cycles of the supersonic signals.

The limited intermediate frequency energy is amplified in the tube 60 and supplied to a discriminator and detector circuit of a modified Conrad type, more specifically the Montjoy type. This discriminator comprises a circuit M tuned slightly above (2000±100 cycles) the mark frequency and a circuit S tuned slightly below (2000±100 cycles) the space frequency. The windings of the tuned circuits M and S are closely coupled to windings $M_1$ and $S_1$. One of the tuned and coupled circuits, say S and $S_1$ is adjustably mounted relative to the other circuit M and $M_1$ so that the mutual inductive coupling therebetween may be adjusted. By this adjustment the sloping characteristic of the discriminator is centered after the system is tuned. The windings $M_1$ and $S_1$ are coupled to detectors MD and SD which may comprise diodes, triodes, or other tubes in common or separate envelopes. In the embodiment illustrated diodes in a common envelope are used. The diodes have their cathodes coupled together in a known manner by load impedances and condenser units 70 and 72 wherein potentials are produced representing mark interval when the receiver is at mark frequency or representing space interval when the receiver is at space frequency. In the embodiment being described the potential at the cathode of one diode varies from positive to negative direct current substantially symmetrically about zero potential, the other diode-cathode being grounded. To reverse polarity the first diode-cathode is grounded and potential at the other diode-cathode used as described.

The diode impedances of units 70 and 72 are coupled to the terminals of a double pole, double throw keying reversing switch KRS. The purpose of this switch is to reverse the polarity of the keying as desired and in the sake of convenience the switch KRS and the corresponding switch KRS' may be ganged if desired. If the recording apparatus is such as to use the higher frequency for mark a transmitted signal which does not use the higher frequency for mark would be reversed at the recording end. Reversing KRS will overcome this defect. Moreover, an operator at the receiver might tune the high frequency oscillator to the wrong side of the signal thereby reversing the signal. Again the polarity may be corrected by switch KRS. The output terminals of the switch KRS are connected by a resistor 73, in lead 78, and coupling condenser 76 to the control grid 79 of an electronic gating tube 80. For the time being assume that the electronic gating tube is conductive so that the description of the signal amplifying chain of B channel may be completed. When 80 is amplifying the signal is fed from the anode 84 thereof over load resistor 93 to recording apparatus such as a telegraph printer of the stop-start type directly or at a remote point by lines. The output may operate a tone keyer which in turn operates the recording or printing mechanism. A filter 100 of the low pass type is preferably included between the gating tubes 80 and 81 and the recording apparatus. The filter may have an upper cutoff characteristic such as to pass alternating current of 200 cycles per second or lower, depending upon the keying speed and to shunt out potentials of higher frequency. A coupling condenser 103 for removing the alternating current component is included in the output connections. The output potential swings plus and minus around about zero potential and is fed through the condenser to recording apparatus. In the embodiment operated the potential swung about ±9 volts.

Our improved means for selecting the best signal by opening the gating tube 80 or 80' excited by the receiver having the best signal will now be described. The supersonic signal is also applied to the grid 104 of a coupling and amplifying tube 110 having its anode coupled to the tuned circuit 120. The winding of circuit 120 forms the primary of a transformer having a secondary winding in a tuned circuit 180 coupled in shunt to the impedance constituted by the diode 182 and its load resistance 184. The diode 182 may be in a separate envelope or in a double diode envelope as shown. The other diode section 182' and its load resistance 184' are similarly coupled to the tuned secondary circuit 180'. The transformers are tuned to center on 50 kc. ±200 cycles and have a pass band which is wide enough to assure no frequency discriminating action at the frequencies passed. To improve the pass characteristics the tuned primary winding may be shunted by a damping resistance 121. In the embodiment used the band pass characteristics are substantially flat over a range of 5500 cycles. The currents passed thereby are to be compared as to magnitude to derive the gating action.

The load resistors 184 and 184' are connected in series, and together with diodes 182 and 182' constitute a differential rectifier circuit. The differential detectors produce across resistors 184 and 184' potentials which depend on the signal strength. The potential developed across the differential resistors 184 and 184' is of a polarity depending upon which receiver gets the strongest signal. This potential is also of a magnitude depending upon the relative strengths of the signals received by the two receivers. The signals of intermediate frequency are rectified in the differentially connected diodes 182 and 182' to produce across resistors 184 and 184' opposed potentials which are positive at the diode-cathodes and which are equal when the signals are of equal strength. The transformers 120 and 180 and 120' and 180' are broadly tuned, as stated above, so that the frequency shifted signals are passed with substantially no frequency selection or attenuation of any part of the frequency spectrum. The potential at the point A is zero when the signals are of equal strength and is positive when the signal from the #1 receiver is strongest and is negative when the signal from the #2 receiver is strongest. The cathode of diode 182' is grounded. This potential of reversible polarity depending on which signal is best is supplied by a resistor 190 to the control grid of a trigger-driver stage or control tube including a double triode 198. The cathode of this tube is connected to ground by a resistor 199 and also to the control grid of a tube 200 connected in a locking circuit. The locking circuit includes a second tube 204 having its anode coupled to the control grid of the tube 200 through resistor 214. The grid of the tube 204 is connected to the anode of the tube 200 through resistor 216. The cathodes of the locking circuit tubes 200 and 204 are connected together by current meters CI in each cathode circuit and to ground through the resistor 219. The anodes of the tubes 200 and 204 are connected to the positive terminal of a direct current source. The grid of tube 200 is connected to the cathode of tube 198 by a resistor 203, while the grid of the tube 204 is connected to the cathode of tube 198' by resistor 203'. The tubes 200 and 204 comprise a tripping circuit somewhat of the type disclosed in Finch U. S. Patent #1,844,950, and in U. S. application Serial #632,978, filed December 5, 1945. The arrangement is such that when current is caused to flow in say tube 200 the potential at the anode of this tube drops to apply a less positive potential on the grid of tube 204 to reduce current in the latter tube. The potential at the anode of tube 204 then rises and this more positive potential is applied to the grid of tube 200 to further increase current flow therein. The action is positive and cumulative so that current is flipped from one tube to the other or vice versa, depending on the potential applied to the control grid of tube 200. The potential on the control grid of tube 200 depends upon the state of conductivity of the tube 198 since the control grid of tube 200 is connected to the cathode resistor of the cathode follower tube 198. The amount of current flowing in the tube 198 depends upon the polarity and/or magnitude of the potential on the control grid of the tube 198. When the potential at the point A becomes positive more current flows in tube 198, whereas when the potential at the point A becomes negative less current flows in tube 198. The potential on the grid of tube 200 is positive at all times but since the cathode of this tube is positive with respect to ground by virtue of the drop in resistor 219 the grid of tube 200 is slightly negative with respect to the cathode of tube 200. Tube 198 is self-biased by resistor 199 to the middle of its operating range so that when the potential at the point A is zero tube 198 is in the middle of its operating range. At this point the locking circuit including tubes 200 and 204 is at rest, i. e., in one of its two positions of stability with current through one tube and cut off in the other or vice versa. When the potential at point A swings negative with respect to ground the current in the tube 198 is reduced as is the current through resistor 199 so that the potential at the grid of tube 200 becomes less positive and current is cutoff in tube 200 and flows in tube 204. When the potential at point A swings less negative or positive the current flow in tube 198 and resistor 199 increases to provide at the control grid of tube 200 a more positive potential so that current flows in the tube 200 and is cutoff in the tube 204. Since the potential at A and on the grid of tube 198 is about zero when the signals are of equal strength some current flows in tube 198 and resistor 199. This resistor is included in the grid circuit of the locking stage tube 200 and tends to make the locking tube circuit non-symmetrical. Under these conditions there might be a tendency for the locking circuit to be unstable so that it would not remain in its last tripped position, i. e., one of its positions of stability. In order to balance the arrangement an additional tube 198' is provided with its control grid connected to ground to be thereby maintained at substantially zero potential. Now when the signals being received are of substantially equal strength and the potential at point A and on the grid of tube 198 about zero equal current flow in the resistors 199 and 199' which are included in the grid circuits of the locking tubes. This assures stability of the system in either of its tripped positions.

The control grids of tubes 200 and 204 are connected to the control grids 79 and 79' respectively of the gating tubes 80 and 80' by resistors 216 and 216'. The cathodes of the gating tubes 80 and 80' are positive with respect to ground by virtue of the potential drop in resistor 85. The cathodes of tubes 200 and 204 are grounded through resistor 219 as stated above so that the differential potentials at the grid ends of resistors 203 and 203' applied to the grids 79 and 79' make one or the other of these gating tubes conductive depending upon which is biased negative to cutoff and which is biased less negative so that it passes current.

Resistors 199 and 199' are of about like value. Resistors 203 and 203' are of about like value. The tubes 198 and 198' are of the same type. In the embodiment illustrated they comprise two triodes in a common envelope using for example a tube type 6SN7GT. As the potential on the grid of tube 198 is varied positive the potential on the grid of tube 200 becomes more positive since potential variations in the cathode impedance 199 are in phase with the potential variations on the grid of tube 198.

A bias clamping and over-load preventing diode 230 has its electrodes coupled in series with a source of direct current say of about 6.3 volts, the series arrangement being in shunt to the input electrodes of the locking circuit driver or control tube 198. The anode of diode 230 is coupled to the grid of tube 198. The cathode of the diode 230 is coupled to the positive terminal of the direct current source the negative terminal of which is grounded, being thereby connected to the cathode of tube 198. If the potential at the point A tends to swing more positive than a selected value current will flow in the tube 230, thereby pulling down this potential and limiting the positive potential on the grid of tube 198 so that the same cannot be overloaded. This improves the operation of the trigger driver tube. In practice the tube 230 and its direct current potential source is such that excessive positive swings have no more effect than excessive negative swings. The driver tube effect on the locking circuit is limited with respect to negative swings by cutoff. The bias clamping tube 230 limits the effect of the trigger driver tube 198 with respect to positive swings of the potential at point A. The effects of the trigger driver tube 198, in response to positive and negative swings, on the locking circuit are made symmetrical.

In the embodiment of Fig. 3 the signal sensing arrangement including the coupling and amplifier tubes 110 and tuned circuits 120 and 180 and differential detectors 182 and 182′, the locking circuit, the bias clamp, the trigger-driver stage and the gating tubes, are all substantially as in Fig. 2, except as noted otherwise hereinafter. The 50 kc. intermediate frequency energy is supplied in Fig. 3 from a receiver #1 through condenser 37 to the grid 104 of the tube 110. Similar connections supply the 50 kc. intermediate frequency energy to the grid 104′ of tube 110′. The gating tubes 80 and 80′ in Fig. 3 are excited by the intermediate frequency signals supplied from receiver #1 and receiver #2 respectively through coupling condensers 36 and 36′ and lines 40 and 40′. The output of receiver #1 supplied through channel B appears across the potential divider circuit including resistors 71 and 73 connecting the receiver #1 output to ground. A portion of this potential drop is supplied by coupling condenser 76 to the gating tube grid 79. The intermediate frequency energy from the selected receiver is passed through one or the other gating tubes depending upon which receiver is selected and appears across a tuned circuit 93′. This circuit 93′ is broadly tuned to pass without attenuation a band of frequencies including mark and space frequencies and their side frequencies resulting from keying. If desired the circuit characteristic may be broadened by including a resistor 97 in shunt thereto. The circuit includes an inductance forming the primary winding of a transformer having the secondary winding in a tuned circuit 240 coupled with the input electrodes of a double triode limiter 250 similar in operation to the current amplitude limiter 50 of Fig. 1. The circuit 240 is tuned in the same manner in which the circuit 93′ is tuned and includes a circuit resonance characteristic broadening resistor 97′ if desired. The output from the current amplitude limiter is supplied by a load impedance 256 and coupling condenser 257 to a coupling and amplifying stage 260 quite similar to the corresponding stage 60 of Fig. 2. The coupling and amplifying stage 260 feeds a discriminator circuit and detector circuit quite like the discriminator circuit and detector circuit in Fig. 1. Corresponding reference characters are used on the discriminator and detector circuits of Figs. 1 and 3 and it is believed unnecessary to redescribe the same in detail at this point in the specification. The output leads of the detectors are coupled by a switch KRS as in Fig. 2 to a low pass filter, and from the filter through a large condenser 262 to output connections for use as desired. This condenser has the same function as the condenser 103 of Fig. 2. However, a condenser of 10 microfarads is used at 262 in Fig. 3 and a condenser of one microfarad at 103 in Fig. 2.

In operation, the signal strength sensing tubes 110, 110′, etc., select the best signal and open the gate tube 80 or 80′ connected to the channel getting the said best signal. The gating tube which is open passes intermediate frequency energy to the common output circuit 93′ and the signal passed is then detected and supplied as output.

The direct current meters MA in the cathode circuits of the triggering tubes serve as indicating means showing how the system is operating. For example, these current meters indicate the response of the triggering circuit to the control potential derived by comparing the signal strengths and also show which gating tube is open, thereby showing which receiver is getting the best signal. The current meters also supply considerable information as to the balance of the locking tube circuit and as to the manner in which the same is controlled by the trigger-driver tube. Current meters MA are included in the cathode circuits of the gating tubes in Fig. 3 and may be included in the cathode circuits of the gating tubes of Fig. 1. These current meters provide indications of which gating tube is passing current and which gating tube is cutoff. It will be noted, however, that the inertia of the current meters is such that even though the gating tubes are fast enough to follow signal keying the current meter hands do not follow the same but indicate average values.

In both modifications control of the gating tubes 80 and 80′ may be reversed, so that that tube heretofore open when tube 200 is conductive is closed, by reversing the leads between resistors 203 and 203′ and the grids of the tubes 200 and 204 or by reversing the leads from resistances 216 and 216′ to the grids 79 and 79′ of the gating tubes 80 and 80′.

What is claimed is:

1. In signalling apparatus, in combination, a plurality of signal pick-up devices, means coupled to the pick-up devices and excited by the signals picked up thereby for comparing the relative strengths of the signals picked up and for producing a direct current potential which is positive or negative, depending on which signal is strongest, a tube valve for each pick-up device having an input electrode excited by currents having characteristics of the picked up signal, a control tube having a control electrode coupled to said means and having output electrodes, a locking circuit having two conditions of stability, one for potentials of one polarity, the other for potentials of the other polarity, a control coupling between the output electrodes of said control tube and said locking circuit for controlling said locking circuit from said produced potential, means for equalizing the effects of swings of said produced potential, in the positive and negative directions, on said locking circuit, a coupling between said locking circuit and said tube valves to make a corresponding one thereof conductive for each condition of stability of said locking circuit, and a common output circuit coupled to said tube valves.

2. In signalling apparatus, in combination, two signal pick-up devices, means coupled to the pick-up devices and excited by the signals picked up thereby for comparing the relative strengths of the signals picked up and for producing a direct current potential which swings plus or minus depending on which signal is strongest, a tube valve for each pick-up device having an input excited by currents having characteristics of the picked up signal, a control tube having a control electrode and cathode coupled to said first means, said control tube having an output electrode, a locking circuit having two conditions of stability and comprising two tubes with their electrodes coupled in such a manner that when current flows in one tube it is cut off in the other and vice versa, a coupling between said control tube and said locking circuit to switch the same to one or the other of its conditions of stability depending on the polarity of the produced potential, a diode in shunt to the control grid to cathode impedance of said control tube, a coupling between said locking circuit and said tube valves to make a corresponding one thereof conductive for each condition of stability of said locking circuit, and a common output circuit coupled to said tube valves.

3. In a diversity system for wave energy keyed in accordance with signals from a first frequency to a second frequency, a plurality of channels each having an input excited by said signals, an electron gating device for each of said channels, each gating device having a control electrode excited by signals passed by one channel and having an output electrode, frequency discriminating and detecting means coupled to the output electrodes of both devices, means for comparing the strengths of the signals fed to the channels and for deriving a unidirectional potential the polarity of which depends upon the relative strengths of the signals fed to the channels, a locking circuit having two conditions of stability, one for potentials of one polarity and the other for potentials of the opposite polarity, and a coupling between said locking circuit and said gating devices for making a corresponding one thereof conductive for each condition of stability of said locking circuit.

HAROLD O. PETERSON.
ROBERT E. SCHOCK.

REFERENCES CITED

The following references are of record in the file of this patent:

UNITED STATES PATENTS

| Number | Name | Date |
|---|---|---|
| 2,253,832 | Whitaker | Aug. 26, 1941 |
| 2,253,867 | Peterson | Aug. 26, 1941 |
| 2,269,594 | Mathes | Jan. 13, 1942 |
| 2,282,526 | Moore | May 12, 1942 |
| 2,414,111 | Lyons | Jan. 14, 1947 |